May 28, 1957
R. J. FRITZ ET AL
2,793,713
FLUID ADSORPTION CHAR HEATING PROCESS
Filed Jan. 21, 1955
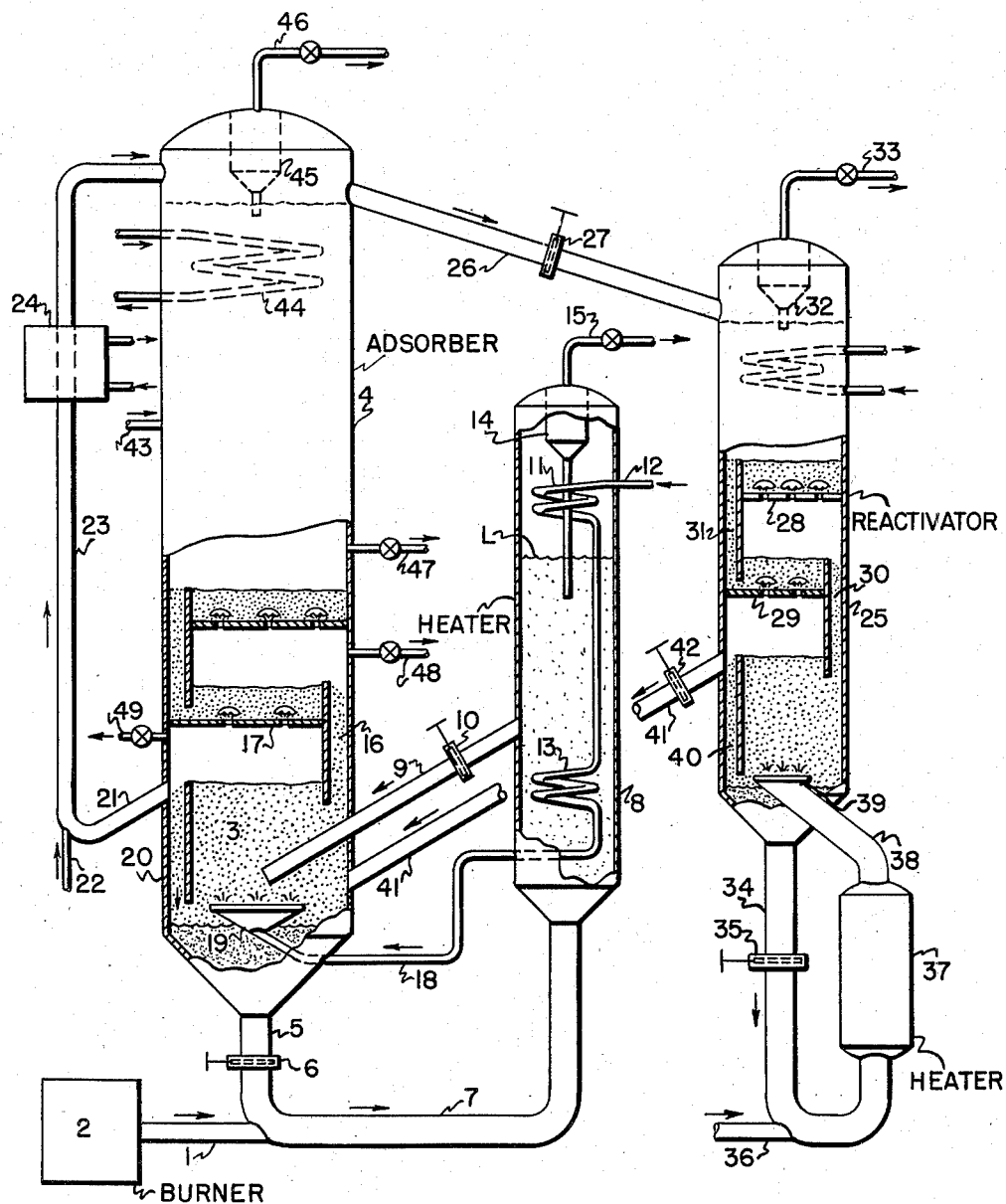
Robert J. Fritz
Edward W. S. Nicholson   Inventors
By   Henry Berk   Attorney

United States Patent Office 2,793,713
Patented May 28, 1957

2,793,713

FLUID ADSORPTION CHAR HEATING PROCESS

Robert Joseph Fritz and Edward Wheelock Steele Nicholson, Baton Rouge, La., assignors to Esso Research and Engineering Company, a corporation of Delaware Application January 21, 1955, Serial No. 483,354

3 Claims. (Cl. 183—114.2)

This invention is concerned with a method of heating a circulating fluidized adsorbent char in an adsorption process, particularly by using heated solid inert particles in what is termed a circulating shot technique.

Many features of a fluidized char adsorption process useful for making a separation between various gases, such as olefinic and paraffinic hydrocarbons, and for purifying hydrogen have been developed as shown in U. S. Patent 2,614,657 of Nicholson et al., U. S. Patent 2,620,047 of R. P. Cahn, 2,660,262 of E. W. Nicholson, and a number of others.

One of the most expensive and difficultly controllable parts of the fluidized char adsorption process is in the heating of the char for desorption and reactivation. The heat loads are high because the circulating finely divided char has to be alternately heated and cooled, which puts high demands on conventional heat exchanger designs and requires therefore extensive heat transfer surface.

In accordance with the present invention, it has been found that a circulating hot shot technique can be employed to obtain a good overall thermal efficiency with elimination of large amounts of heat transfer surface previously used. By the term shot is meant particles or granules of an inert material which can be heated to the high temperatures needed in the process, can be mixed with the char without causing excessive attrition or undesired reactions, and can be separated from the char at proper points in the system. Suitable shot materials may be in a somewhat spherical or pebble-like form and be composed of clay ingredients, such as a fused mixture of 25% silica and 75% alumina. One of these materials, known as Mullite, is particularly suitable. In general the suitable shot materials should have 3 to 4 times the density (grams per cubic centimeter) of the char. The finest particles of shot should be at least 2 times, preferably 4 or 5 times, the size of the coarsest char particles.

The method of employing the shot heating technique will be described with reference to the flow diagram shown in the drawing.

As shown in the drawing a suitable shot material, e. g. Mullite of 32 to 48 mesh particle size, is heated directly by flue gas injected through line 1 from auxiliary burner or furnace 2. This flue gas serves to circulate the shot withdrawn from a desorber zone 3 as in the bottom of an adsorber tower 4.

The shot is passed through withdrawal pipe 5 through an opened slide valve 6 and is injected by the flue gas through pipe 7 into the desorption heater 8.

In the heating vessel 8, the Mullite particles are maintained in a fluidized bed which can be made to have a level L. With the vessel 8 and the level L at a suitable elevation the heated Mullite particles can be made to flow by gravity via pipe 9 back into the desorption zone 3. Flow can be controlled through pipe 9 by slide valve 10. For temperature control in the heating vessel 8, a steam coil 11 with inlet 12 can be placed inside the heating vessel 8. Part of the steam coil may be immersed in the fluidized bed below level L and part may be exposed to the gases passing above the bed to be removed from the vessel 8 through a cyclone separator 14; thence, through drawoff pipe 15. The exit gas from the heating vessel 8 can have its temperature reduced to 500° F. or less by heat exchange with steam via coil 11 while the shot is brought up to temperatures in a range of 700° to 800° F. by the high temperature flue gas having initially a temperature in the range of 900° to 1000° F. The heated Mullite shot entering the desorbent zone 3 at 700° F. to 800° F. heats the char flowing down into the zone to free the adsorbed hydrocarbons. The char tends to enter the desorption zone 3 through a downcomer 16 from an upper tray 17. The char may have a temperature, for example, in the range of 250° F. to 350° F. on entering the desorption zone, but the char then is quickly heated up to a temperature of 500° F. or thereabove, by intermingling with higher temperature shot.

Superheated steam which is obtained from the heat exchange coils 11 and 13 is injected by line 18 through distributor 19 in the lower part of the desorbing zone 3 for bringing about intimate mixing of the hot shot with the char that is being subjected to desorption. The char after being freed of the hydrocarbon tends to enter a low velocity zone at one side of the desorber and in this lower velocity zone the inert shot solids settle out toward the bottom so that they can be removed through the drawoff 5 for recirculation to the heater 8. The lighter char particles are drawn from the low velocity chamber 20 through pipe 21 to be picked up by gas injected through line 22 and transferred through line 23, through cooler 24 to the upper part of the absorber tower 4 to complete the cycle.

Additional advantages accrue in using the same kind of shot in heating some of the char to still higher temperatures for accomplishing reactivation. These advantages will become evident from the following description with reference to the drawing and particularly with reference to the desorbed char reactivator vessel 25.

A portion of the desorbed char can be led through pipe 26 with its slide valve 27 open down into the reactivator 25 to be contacted therein by hot flue gas. Vessel 25 may be equipped with internal trays 28 and 29 and downcomer passages 30 and 31 to have the char pass downwardly countercurrent to the heating gas. The spent heating gas is drawn through a cyclone separator 32 and valve-controlled vent pipe 33. In a bottom portion of the reactivating vessel 25 the char forms a fluidized mixture with recirculated hot shot where the char becomes heated up to an elevated temperature as in the range of 1500° to 1800° F. in order to bring about decomposition of organic material that is on the char and causes deactivation of the char. The heated shot settles to the bottom of the vessel 25, thus becoming separated from the lighter char so that it can be withdrawn through the standpipe 34 through slide valve 35 and then be recirculated by high temperature gas injected through line 36. The heating vessel 37 is placed in the recirculation line to provide space and time for the shot to become heated by the flue gas before the stream of heated shot is returned through the line 38 and a grid plate 39 into the fluidized bed of char.

It is preferred that the flue gas injected into the stream of Mullite contain carbon dioxide and water vapor with little free oxygen. These high temperature flue gas components react with adsorbed organic matter and a portion of the char to provide new adsorptive surface and thus replace surface coated or contaminated in the adsorption cycle. The char is regenerated in this manner. An auxiliary burner can be provided to operate with a deficiency of air so that it forms a flue gas containing very little or no oxygen. If desired, a small amount of additional natural gas fuel may be introduced directly into vessel 37 to react with any excess oxygen in the flue gas introduced through line 36, thus insuring an oxygen-free gas introduced through line 38. Also some air as well as natural gas may be added directly to vessel 37 to provide at least some of the necessary heat by direct combustion in vessl 37. It should be noted that oxygen will tend to regenerate new and active surface on the char but it is not as effective as $CO_2$ and steam.

The heated reactivated char is drawn from a low velocity zone 40 at the bottom of the reactivating vessel 25 so that it can flow down through transfer line 41 through its slide valve 42 into the desorbing section 3 of the tower 4.

The adsorption section in tower 4 can be operated above the desorption section in the same manner as in the towers described in the patents enumerated, e. g. U. S. Patent 2,666,500 of R. P. Cahn et al. or U. S. 2,678,111 of H. J. Ogorzaly. However, it is to be noted that in the process of the present invention instead of supplying large amounts of heat through heat exchange surface, 100% of the heat required is supplied directly by the shot and by steam which in turn was formed in the presence of the shot. The feed mixture of compounds to be separated, e. g. a mixture of hydrogen, methane, ethane, ethylene, propane and propylene, is fed into the adsorber tower 4 through line 43 so that the gases tend to pass upwardly countercurrent to the fluidized char in an adsorption section above the feed inlet. In the adsorption and rectifying section above the feed inlet, cooling means such as cooling coils 44 are provided for controlling the temperature.

The unadsorbed gas, e. g. methane, hydrogen, nitrogen, etc. is passed through a cyclone separator 45 to be taken overhead through line 46. Below the feed inlet the char containing adsorbed hydrocarbons such as ethane and propylene flows down from bubble plate to bubble plate countercurrent to gas which removes the less strongly adsorbed hydrocarbon components such as methane and ethane. These components can be withdrawn through one or more side streams, lines 47 and 48. A desorbed gas product may be also withdrawn through line 49.

One problem entering into the practicability of the process described is involved in the separation of the desorbed char from the shot at the base of tower 4 or in the desorption section 3. This problem has been solved by reducing the velocity of gas passing through the mixed solids to the point at which even the coarsest char particles remain in suspension while the denser shot settles out. The coarsest char particles are of the order of 100 to 150 microns for suitable fluidization and with such particles it is possible to use relatively fine shot particles averaging about 400 microns or in the range of 300 to 500 microns. Taking into account a particle density of about 0.9 gram per cc. for char and about 3 grams per cc. for the shot particles, the free-falling velocity of the shot particles can be made to be close to 10 times as great as that of the char which is of particle size between 20 and 150 microns and with this ratio a good separation of the suspended char particles from the settling shot particles is effected. Thus, the shot particles with the char practically completely removed can be sent to a heater for contact with high temperature flue gas without sustaining a significant loss by burning of the char by any oxygen present in the flue gas. The loss by burning of the char can be reduced to less than 1% per day.

Another important problem involved is the matter of how much attrition occurs when the dense shot particles are mixed with the char particles. Tests have shown that useful chars for selective adsorption, particularly of compounds such as ethylene and propane, made from cocoanut shells or from petroleum acid sludge have excellent attrition resistance qualities and would undergo very little loss by formation of unsuitable fines of substantially less than 20 micron particle size.

The overall improvement is obtained with the advantages of reducing char loss and reduced volumes of heating gas by using the described method of operating in which the char particles are made to flow downwardly through a column equipped with horizontal plates while the heating gas is passed upwardly through the column. The char particles collected on each of the successive plates are made to take the form of a fluidized bed on each of the plates through which the gas rises.

The char particles passed from the bottom plate into a heating zone are admixed in the heating zone with an incoming stream of the larger hot shot particles which impart additional heat to the char particles. The turbulent mixing of the char particles with the hot char particles is obtained by introducing the steam or desorption gas into a lower part of the turbulent section of the heating zone. From the turbulent section the mixture of particles flows into a low velocity zone in flowing away from the hot gas jets through which the desorption gas in introduced into the heating zone. The lower velocity zone may be separated from the other part of the heating zone by a baffle or dam as indicated in the drawing. In the lower velocity zone the finer char particles are buoyed upwardly and the gas suspension of these finer char particles can thus be separated. The heavier and larger inert solid particles used as hot shot tend to gravitate in the lower velocity zone downwardly toward the interface of the hot shot which collects below the fluidized mixture of hot shot particles and fine char particles in the heating zone.

The following example is given to illustrate temperature and flow rate controls which enter in the use of the circulating shot. The general manner of handling the adsorption is not drastically changed; therefore, emphasis will be placed on the manner of handling the heating of the char for desorption and heating of the char for reactivation.

*Example*

To improve a small plant designed to handle about 10,000 cu. ft. per hour of a refinery gas from which ethylene and propylene are to be recovered, the char of principally 20 to 125 micron size is made to pass downwardly through the adsorber tower to have adsorption take place at 120° to 250° F. Then, the desorption is carried out at 500° F. For a plant of this size the char circulation rate may be as high as 4000 lbs. per hour. The adsorption tower can be operated to bring the temperature of the char up to approximately 300° F. just before the char passes into the desportion section where final desorbed gas product is removed. Then to heat the char to a desportion temperature of 500° F. approximately an equal flow rate of the larger particle size and denser shot can be used when the shot has been heated in the desorption heater 8 to a temperature of at least 700° F. Thus, the shot can be used effectively when it is supplied to the desorber section 3 at a rate similar to the rate at which the char flows through this section.

In the course of the operation, it is desirable to reactivate about 3% of the char continuously. A high temperature is needed for the reactivation of the order of 1400° to 1800° F. This is accomplished by using a flue gas containing steam and carbon dioxide at a high temperature aided by recirculating hot shot which is kept at a temperature in the range of 1600° to 1800° F.

It is to be understood that various feed gas compositions may be treated to separate components which are more selectively absorbed. Typical feed gas compositions may contain hydrogen sulfide, carbon dioxide, carbon monoxide, hydrogen, nitrogen, methane, ethane, ethylene, propane, propylene and some of the higher hydrocarbons. There may be alterations in the compositions of the feeds.

The invention described is claimed as follows:

1. In a process for separating gaseous components of a mixture by contact with a fluidized char having a particle size between about 20 and 150 microns and which preferentially adsorbs some of the components from the mixture in an adsorption zone and the preferentially adsorbed components are finally desorbed from the fluidized char by heating in a desportion zone, the improvement which comprises heating the char in said desorption zone to temperatures of at least 500° F. by admixing the fluidized char in the substantial absence of free oxygen with a sufficient amount of relatively hot and dense inert solid shot particles having a particle size between about 300 and 500 microns to increase the temperature of the char, maintaining the char in a fluidized suspension while the said shot particles are separated by settling therefrom, separately removing the char particles from the desorption zone for reuse in said adsorption zone, and removing the settled shot particles substantially free of char for reheating and recontact with char in said desorption zone.

2. In a process for separating gaseous hydrocarbon components of a gas mixture by selective adsorption on and desorption from a fluidized finely divided adsorbent char having a particle size between about 20 and 150 microns, the improvement which comprises withdrawing to a reactivation zone a minor portion of said char particles following adsorption and desorption at a temperature not above about 500° F., mixing the char particles in the reactivation zone with relatively dense inert shot particles having a particle size between about 300 to 500 microns heated to a temperature above 1500° F., maintaining the mixture of char and inert solids as a dense turbulent bed by passing a fluidizing gas substantially free of oxygen upwardly therethrough and thereby heating the char to a reactivation temperature between about 1400° to 1800° F., passing the mixed solids to a relatively non-turbulent zone, withdrawing reactivated char particles as a separate stream from an upper portion of the relatively non-turbulent zone and returning them to the adsorption-desorption cycle, withdrawing from a lower portion of the relatively non-turbulent zone a separate stream of inert shot particles essentially free of char, mixing the withdrawn shot particles with hot combustion gases in a heating zone to reheat the shot particles to a temperature of at least 1600° F., and passing the reheated shot particles together with the combustion gases to the reactivation zone for mixing with further amounts of deactivated char.

3. In a process wherein a mixture of gaseous hydrocarbons is separated into its components by selective adsorption on finely divided adsorbent char having a particle size of about 20 to 150 microns at temperatures of about 120° to 250° F. in a multistage adsorption zone and subsequent selective desorption from the char at a more elevated temperature in a desorption zone, the improvement of mixing relatively cool char particles in the desorption zone in the substantial absence of free oxygen with relatively dense inert solids having a particle size between about 300 and 1500 microns and preheated to a temperature of at least 700° F., the amount of admixed inert particles being sufficient to heat the char particles to a desorption temperature of about 500° F., passing steam upwardly through the mixed solids in the desorption zone to maintain the solids as a turbulent fluidized mass and to strip desorbed hydrocarbons therefrom, withdrawing the desorbed hydrocarbons from an upper portion of the desorption zone, overflowing the turbulent mixed solids into a relatively quiescent zone where the relatively heavy inert solids settle out from the relatively light char particles, withdrawing the stripped char particles from an upper portion of said relatively quiescent zone and returning the stripped char particles to the adsorption zone, separately withdrawing the inert solids essentially free of char, reheating the withdrawn inert solids to a temperature of at least about 700° F. by contact with hot combustion gases, separating the reheated solids from the combustion gases, and returning the reheated solids to the desorption zone.

References Cited in the file of this patent
UNITED STATES PATENTS

| | | |
|---|---|---|
| 2,393,636 | Johnson | Jan. 29, 1946 |
| 2,523,149 | Scheeline | Sept. 19, 1950 |